Figure 1:
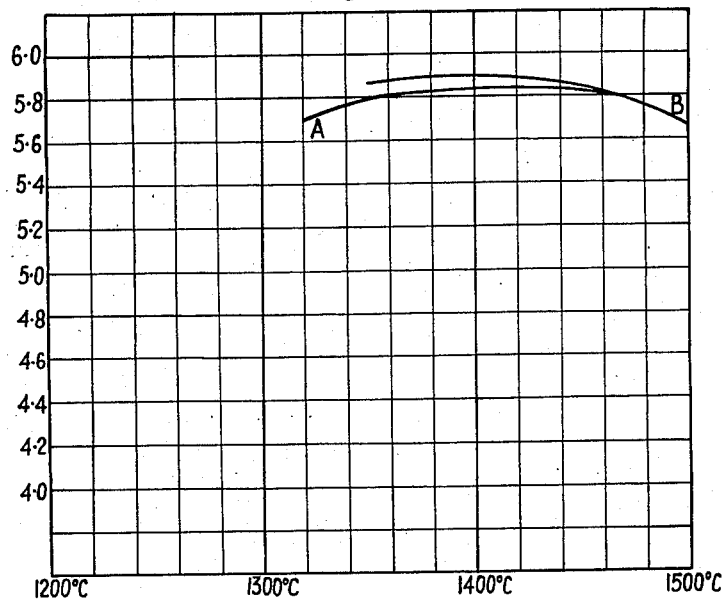

Oct. 4, 1960

K. W. PLESSNER ET AL 2,955,048

CERAMIC DIELECTRIC MATERIALS

Filed April 12, 1957

Inventors
Karl Wolfgang Plessner &
Roger West
By
*Their* Attorneys

2,955,048
CERAMIC DIELECTRIC MATERIALS

Karl Wolfgang Plessner, Ruislip, and Roger West, South Harrow, England, assignors to British Dielectric Research Limited, London, England, a British company Filed Apr. 12, 1957, Ser. No. 652,482

Claims priority, application Great Britain Apr. 17, 1956

14 Claims. (Cl. 106—39)

Application No. 583,498 filed May 8, 1956, and now U.S. Patent No. 2,918,381, relates to ceramic materials based on barium titanate containing as additives a minor proportion of calcium zirconate and not more than 1%, based on the calcium zirconate and barium titanate content, of magnesium oxide. In other words the material is one which on analysis shows as ingredients barium oxide, calcium oxide, magnesium oxide, titania and zirconia, the relationship between the barium content and titanium content being substantially stoichiometric for the formation of barium titanate, the relationship between the calcium content and zirconium content being substantially stoichiometric for the formation of calcium zirconate (in an amount less than the amount of barium titanate) and the magnesium oxide content being up to 1% of the total weight of calcium oxide, zirconia, barium oxide and titania.

The present invention, which is a modification of the invention disclosed in the above application, is based on the discovery that the same effects, namely an increase in the density of the ceramic and an improvement in the temperature coefficient of dielectric constant, can be obtained if the calcium zirconate is replaced by a zirconate of one or more other alkaline earth metals and/or by a stannate or stannates of an alkaline earth metal or metals. In this specification the term alkaline earth metal includes only calcium, strontium and barium. The content of magnesium oxide is unchanged, as little as ¼% by weight, based on the total weight of other ingredients, gives a useful improvement, the maximum amount used being 1%. The preferred limits are ¼% to ¾%, ½% being the preferred content.

In accordance with the invention therefore a ceramic dielectric material comprises a fired mixture consisting of barium titanate with a minor proportion of one or more zirconates and/or stannates of alkaline earth metals (other than calcium zirconate) and containing an addition of up to 1% of magnesium oxide. In other words the material is one which on analysis shows as ingredients, barium oxide with or without an additional alkaline earth metal oxide or oxides, magnesium oxide, titania and zirconia or stannic oxide or both zirconia and stannic oxide. Compositions which on analysis show only barium oxide, calcium oxide, magnesium oxide, titania and zirconia are excluded since they are the subject of the above-mentioned earlier application. The barium oxide content is always sufficient to combine with substantially all of the titania and may be in excess over this amount, the excess of barium oxide and/or the additional alkaline earth metal oxides being present in an amount sufficient to combine with all of the stannic oxide and/or zirconia present, and the amount of magnesium oxide present being up to 1% of the total weight of all other ingredients.

As is now well known the properties of the system $BaO.MO.TiO_2.XO_2$, where M is an alkaline earth metal other than Ba and X is Sn or Zr, are not substantially changed by small variations in the ratio of BaO to $TiO_2$, provided that the ratio of $(BaO+MO):(TiO_2+XO_2)$ is substantially unchanged and provided that the mol percent of $MTiO_3$ does not rise above 5 mol percent of the total mol content of alkaline earth metal titanate+alkaline earth metal stannate and/or zirconate. Such variations are included in the scope of the present invention.

We have also found that variations in the ratio of the total content of divalent alkaline earth metal ions (BaO with or without MO) to the total content of tetravalent ions ($TiO_2+ZrO_2$ and/or $SnO_2$) can be tolerated, provided that the ratio of the divalent ions to tetravalent ions remains between 0.98:1 and 1.02:1. Such variations are also included in the scope of the present invention.

An important advantage of the present invention is that the standard manufacturing techniques at present used in the manufacture of barium titanate ceramics can be used; for example as described by Bunting, Shelton and Creamer in J. Res. Nat. Bur. Stds. 38, 337, 1947. We prefer to form the ceramic material by mixing together barium carbonate, with or without carbonates of calcium and strontium, titanium dioxide, zirconium oxide and/or stannic oxide, and magnesium oxide, prefiring this mixture, grinding it up again and, after forming it to the desired shape, firing it at a temperature between 1300 and 1400° C.

The proportions of magnesium oxide and alkaline earth metal zirconate and/or stannate are adjusted within the limits specified above to obtain optimum increase in density (or reduction of firing temperature) consistent with a minimum variation of the dielectric constant over a desired temperature range.

Except for special applications, the alkaline earth metal zirconate or stannate contents will generally not rise above 25 mol percent.

Where more than one stannate and/or zirconate are present, the maximum total content will vary in proportion to the amount of each used, for example with 10% of calcium zirconate (⅖ of the maximum) the maximum content of calcium stannate would be 15% (⅗ of the maximum), and when used in conjunction with 5% of calcium stannate, the maximum content of barium stannate would be 20%.

For normal applications, when the peak of the temperature coefficient of capacitance curve is required to be at or about room temperature, quantities much less than these will be used.

Figure 2:
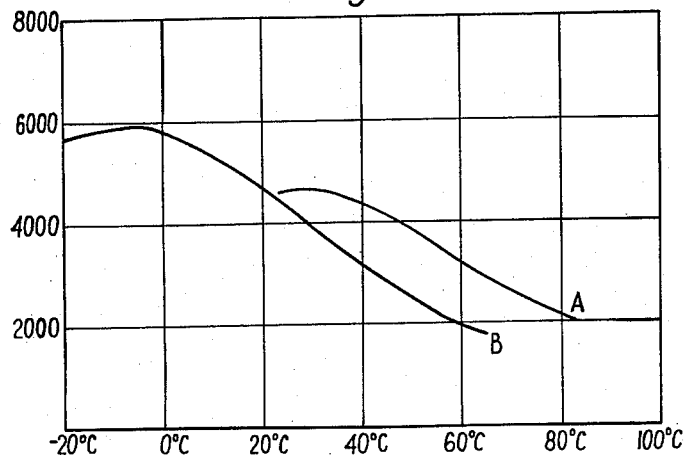

The preparation of and properties of two materials in accordance with the invention will now be described by way of example with reference to the accompanying drawings in which Figure 1 is a graph showing the variation of density (vertically) with firing temperature (horizontally) of the compositions and Figure 2 is a graph showing permittivity (vertically) against temperature (horizontally).

Both the compositions were prepared from commercial raw materials as follows:

Barium carbonate=Laporte "Pure"
Titania=Kronos E Anatase supplied by British Titan Products
Calcium carbonate=British Drug Houses precipitated
Zirconia sold by the Titanium Alloy Division of the National Lead Co. as "C.P."
Stannic oxide sold by Keeling and Walker Ltd. as "Superlite"
Magnesium oxide=British Drug Houses Analar B.D.H. Analar grade magnesium oxide was used because it appeared to be of smaller particle size than the B.D.H. "heavy" grade. All of the materials are of particle size within the range of 0.5–10 microns. We believe that the particle size is not critical. Quantities of powder calculated to give 100 gm. (after driving off carbon dioxide) of each of Compositions A and B as set out below were mixed in a rubber-lined flint pebble mill of 750 cc. capacity, using 150 cc. of 0.1% gum arabic solution in water as the dispersing medium. The mill was run for 6 hours at 69 r.p.m., the slip filtered and the dried filter-cake calcined for 3 hours at 1120° C. After the calcination 10–15% water was added as a binder, using a pestle and mortar to incorporate the water and to break up the powder to pass a 25 mesh sieve.

Discs, ⅞″ diameter and approximately 2 mm. thick, were pressed from this powder at 3 tons/sq. inch and fired at various temperatures between 1300° C. and 1500° C. for 3-hour soak periods. The rate of rise and fall of temperature was approximately 130° C. per hour.

The discs were provided with fired-on silver electrodes and the permittivity (at 50 c./s.) was then recorded as a function of temperature. The temperature range covered was varied so as to include the permittivity peak on the record. The apparent density of the fired discs was determined by using Archimedes' principle.

Composition A contains 92.5% barium titanate, 7.5% barium zirconate and 0.5% magnesium oxide based on the total weight of the barium titanate and zirconate. Composition B contains 94.5% barium titanate, 5.5% calcium stannate and 0.5% magnesium oxide based on the total weight of the barium titanate and calcium stannate.

From a comparison of the curves A and B in Figures 1 and 2 with the equivalent curves in the figures of the specification of the above-mentioned earlier application it will be seen that similar effects are obtained to those described in that application when the calcium zirconate addition is replaced by either barium zirconate or calcium stannate.

In the following claims the expression "materials which yield on firing" alkaline earth metal oxides, titanium dioxide etc., is intended to include the oxides per se.

What we claim as our invention is:

1. A barium titanate ceramic dielectric material consisting essentially of barium oxide, an oxide selected from the group consisting of strontium and barium, magnesium oxide, titania and zirconia, the relationship between the barium oxide content and titania content being substantially stoichiometric for the formation of barium titanate, the relationship between the said group oxide content and zirconia content being substantially stoichiometric for the formation of a zirconate of the said group barium and strontium in an amount less than the amount of barium titanate and at least 2% by weight of the barium titanate and said group zirconate together, and the magnesium oxide content being ¼%–1% of the total weight of said group oxide, zirconia, barium oxide and titania.

2. A ceramic material in accordance with claim 1 in which the relationship between the barium oxide and titanium dioxide content is varied from stoichiometric to the extent that the excess of one of these constituents is sufficient to form a molar percentage not greater than 5 of one compound selected from the group consisting of a titanate of said group strontium and barium and barium zirconate the ratio of (BaO+said group oxide): ($ZrO_2$+$TiO_2$) being within the limits 0.98:1 and 1.02:1.

3. A barium titanate ceramic dielectric material consisting essentially of barium oxide, an oxide selected from the group consisting of strontium and barium, magnesium oxide, titania and zirconia, the relationship between the barium oxide content and titania content being substantially stoichiometric for the formation of barium titanate, the relationship between the said group oxide content and zirconia content being substantially stoichiometric for the formation of a zirconate of said group barium and strontium in an amount from 2% to 20.5% of the amount of barium titanate and said group zirconate, and the magnesium oxide content being ¼ to 1% of the total weight of said group oxide, zirconia, barium oxide and titania.

4. A ceramic material in accordance with claim 3 in which the relationship between the barium oxide and titanium dioxide content is varied from stoichiometric to the extent that the excess of one of these constituents is sufficient to form a molar percentage not greater than 5 of one compound selected from the group consisting of a titanate of said group strontium and barium and barium zirconate the ratio of (BaO+said group oxide): ($ZrO_2$+$TiO_2$) being within the limits 0.98:1 and 1.02:1.

5. A barium titanate ceramic dielectric material consisting essentially of barium oxide, an oxide selected from the group consisting of barium and strontium, magnesium oxide, titania and zirconia, the relationship between the barium oxide content and titania content being substantially stoichiometric for the formation of barium titanate, the relationship between the said group oxide content and zirconia content being substantially stoichiometric for the formation of a zirconate of said group barium and strontium in an amount less than the amount of barium titanate and at least 2% by weight of the barium titanate and said group zirconate together, and the magnesium oxide content being ½% of the total weight of said group oxide, zirconia, barium oxide and titania.

6. A method of manufacturing a barium titanate ceramic dielectric material which comprises mixing together materials which on prefiring consists essentially of barium oxide, titania, an oxide selected from the group consisting of strontium and barium, zirconium oxide and magnesium oxide, prefiring this mixture, grinding the prefired mixture, shaping it and firing it to form a ceramic material, the amounts of the ingredients used being such as to form barium titanate, a zirconate of said group strontium and barium in an amount less than the amount of barium titanate but at least 2% by weight of the barium titanate and said group zirconate together and ¼%–1% of magnesium oxide based on the total weight of barium titanate and said group zirconate.

7. A method in accordance with claim 6 in which the relationship between the barium oxide and titanium dioxide content is varied from stoichiometric to the extent that the excess of one of these constituents is sufficient to form a molar percentage not greater than 5 of one compound selected from the group consisting of a titanate of said group strontium and barium and barium zirconate the ratio of (barium oxide+said group oxide): (zirconia+titania) being within the limits 0.98:1 and 1.02:1.

8. A method of manufacturing a barium titanate ceramic dielectric material which comprises mixing together materials which on prefiring consists essentially of barium oxide, titania, an oxide selected from the group consisting of strontium and barium, zirconium oxide and magnesium oxide, prefiring this mixture, grinding the prefired mixture, shaping it and firing it to form a ceramic material, the amounts of the ingredients used being such as to form barium titanate, 2% to 20.5% of a zirconate from said group strontium and barium based on the weight of barium titanate and said group zirconate and ¼% to 1% of magnesium oxide based on the weight of barium titanate and said group zirconate.

9. A method in accordance with claim 8 in which the relationship between the barium oxide and titanium dioxide content is varied from stoichiometric to the extent that the excess of one of these constituents is sufficient to form a molar percentage not greater than 5 of one compound selected from the group consisting of a titanate of said group strontium and barium and barium zirconate the ratio of (barium oxide+said group oxide):(zirconia +titania) being within the limits 0.98:1 and 1.02:1.

10. A method of manufacturing a barium titanate ceramic dielectric material which comprises mixing together materials which on prefiring consists essentially of barium oxide, titania, an oxide selected from the group consisting of strontium and barium, zirconium oxide and magnesium oxide, prefiring this mixture, grinding the prefired mixture, shaping it and firing it to form a ceramic material, the amounts of the ingredients used being such as to form barium titanate, 2% to 20.5% of a zirconate from said group strontium and barium and ½% of magnesium oxide based on the total weight of barium titanate and said group zirconate.

11. A barium titanate ceramic dielectric material consisting essentially of barium oxide, alkaline earth oxide, magnesium oxide, titania and stannic oxide, the relationship between the barium oxide content and titania content being substantially stoichiometric for the formation of barium titanate, the relationship between the alkaline earth oxide content and stannic oxide content being substantially stoichiometric for the formation of alkaline earth stannate in an amount less than the amount of barium titanate and at least 2% by weight of the barium titanate and alkaline earth stannate together, and the magnesium oxide content being ¼%–1% of the total weight of alkaline earth oxide, stannic oxide, barium oxide and titania.

12. A barium titanate ceramic dielectric material consisting essentially of barium oxide, alkaline earth oxide, magnesium oxide, titania and stannic oxide, the relationship between the barium oxide content and titania content being substantially stoichiometric for the formation of barium titanate the relationship between the alkaline earth oxide content and stannic oxide content being substantially stoichiometric for the formation of alkaline earth stannate in an amount from 2% to 20.5% of the amount of barium titanate and alkaline earth stannate, and the magnesium oxide content being ¼ to 1% of the total weight of said group oxide, stannic oxide, barium oxide and titania.

13. A method of manufacturing a barium titanate ceramic dielectric material which comprises mixing together materials which on prefiring consists essentially of barium oxide, titania, an alkaline earth oxide, stannic oxide and magnesium oxide, prefiring this mixture, grinding the prefired mixture, shaping it and firing it to form a ceramic material, the amounts of the ingredients used being such as to form barium titanate, alkaline earth stannate in an amount less than the amount of barium titanate but at least 2% by weight of the barium titanate and alkaline earth stannate together and ¼%–1% of magnesium oxide based on the total weight of barium titanate and alkaline earth stannate.

14. A method of manufacturing a barium titanate ceramic dielectric material which comprises mixing together materials which on prefiring consists essentially of barium oxide, titania, an alkaline earth oxide, stannic oxide, and magnesium oxide, prefiring this mixture, grinding the prefired mixture, shaping it and firing it to form a ceramic material, the amounts of the ingredients used being such as to form barium titanate, 2% to 20.5% of alkaline earth stannate based on the weight of barium titanate and alkaline earth stannate and ¼% to 1% of magnesium oxide based on the total weight of barium titanate and alkaline earth stannate.

References Cited in the file of this patent

UNITED STATES PATENTS

| | | |
|---|---|---|
| 2,402,516 | Wainer | June 18, 1946 |
| 2,402,518 | Wainer | June 18, 1946 |
| 2,695,239 | Oshry | Nov. 23, 1954 |
| 2,695,240 | Oshry | Nov. 23, 1954 |
| 2,815,291 | Rogatz | Dec. 3, 1957 |

FOREIGN PATENTS

| | | |
|---|---|---|
| 747,716 | Great Britain | Apr. 11, 1956 |